US006861975B1

(12) United States Patent
Coleman Jr. et al.

(10) Patent No.: US 6,861,975 B1
(45) Date of Patent: Mar. 1, 2005

(54) CHIRP-BASED METHOD AND APPARATUS FOR PERFORMING DISTRIBUTED NETWORK PHASE CALIBRATION ACROSS PHASED ARRAY ANTENNA

(75) Inventors: John Roger Coleman Jr., Palm Bay, FL (US); Travis Sean Mashburn, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 58 days.

(21) Appl. No.: 10/603,847

(22) Filed: Jun. 25, 2003

(51) Int. Cl.[7] .................................................. G01S 7/40

(52) U.S. Cl. .................. 342/174; 342/25 R; 342/25 A; 342/118; 342/128; 342/165; 342/173; 342/195; 342/196; 342/352; 342/368; 342/371; 342/375; 342/131; 342/132

(58) Field of Search .......................... 343/700 MS, 703, 343/705–708; 342/25 R–26 D, 118, 128–133, 165–175, 192–197, 368–384, 352–356

(56) References Cited

U.S. PATENT DOCUMENTS

| | | | | | |
|---|---|---|---|---|---|
| 4,488,155 | A | * | 12/1984 | Wu | 342/376 |
| 4,821,037 | A | * | 4/1989 | Miller et al. | 342/383 |
| 4,926,186 | A | * | 5/1990 | Kelly et al. | 342/360 |
| 5,248,982 | A | * | 9/1993 | Reinhardt et al. | 342/375 |
| 5,412,414 | A | * | 5/1995 | Ast et al. | 342/174 |
| 5,455,592 | A | * | 10/1995 | Huddle | 342/174 |
| 5,530,449 | A | * | 6/1996 | Wachs et al. | 342/174 |
| 5,543,801 | A | * | 8/1996 | Shawyer | 342/174 |
| 5,572,219 | A | * | 11/1996 | Silverstein et al. | 342/375 |
| 5,677,696 | A | * | 10/1997 | Silverstein et al. | 342/174 |
| 5,680,141 | A | * | 10/1997 | Didomenico et al. | 342/372 |
| 5,861,843 | A | * | 1/1999 | Sorace et al. | 342/372 |
| 5,929,809 | A | * | 7/1999 | Erlick et al. | 342/372 |
| 5,940,032 | A | * | 8/1999 | Passmann et al. | 342/372 |
| 6,124,824 | A | * | 9/2000 | Xu et al. | 342/174 |
| 6,127,966 | A | * | 10/2000 | Erhage | 342/174 |
| 6,137,442 | A | * | 10/2000 | Roman et al. | 342/375 |
| 6,157,343 | A | * | 12/2000 | Andersson et al. | 342/371 |
| 6,163,296 | A | * | 12/2000 | Lier et al. | 342/174 |
| 6,208,287 | B1 | * | 3/2001 | Sikina et al. | 342/174 |
| 6,295,027 | B1 | * | 9/2001 | Wixforth et al. | 342/368 |
| 6,448,939 | B2 | * | 9/2002 | Maruta | 342/380 |
| 6,480,153 | B1 | * | 11/2002 | Jung et al. | 342/368 |
| 6,693,588 | B1 | * | 2/2004 | Schlee | 342/368 |
| 6,720,919 | B1 | * | 4/2004 | Sinsky et al. | 342/368 |

* cited by examiner

*Primary Examiner*—Bernarr E. Gregory
(74) *Attorney, Agent, or Firm*—Allen, Dyer, Doppelt, Milbrath & Gilchrist, P.A.

(57) ABSTRACT

A chirp-based arrangement derives a measure of phase variation through a reference frequency transport cable of a phased array antenna architecture, such as a spaceborne synthetic aperture radar system. A direct digital synthesized chirp signal is injected in an upstream direction into the transport cable from a downstream end thereof, so that the chirp signal is transmitted in an upstream direction, reflected from an upstream bandpass filter, and returned in a downstream direction. At each of a plurality of nodes that are distributed along the transport cable, the two chirp signals are extracted and frequency domain-processed to derive said measure of transport delay through the cable between the source of the reference frequency signal and each of the nodes.

16 Claims, 1 Drawing Sheet

CHIRP-BASED METHOD AND APPARATUS FOR PERFORMING DISTRIBUTED NETWORK PHASE CALIBRATION ACROSS PHASED ARRAY ANTENNA

CROSS-REFERENCE TO RELATED APPLICATION

The present invention relates to subject matter disclosed in our co-pending U.S. patent application Ser. No. 10/603, 843, filed Jun. 25, 2003, entitled: "Chirp-based Method and Apparatus for Performing Phase Calibration Across Phased Array Antenna" (hereinafter referred to as the '843 application), assigned to the assignee of the present application, and the disclosure of which is incorporated herein.

FIELD OF THE INVENTION

The present invention relates in general to communication systems and subsystems therefor, and is particularly directed to a new and improved, distributed chirp-based arrangement for deriving a very accurate measure of phase variation through respective sections of a reference frequency transport cable of a relatively physically large phased array antenna architecture, such as a spaceborne synthetic aperture radar system.

BACKGROUND OF THE INVENTION

Relatively large phased array antenna architectures, such as but not limited to spaceborne, chirped synthetic aperture radar systems, typically contain a multiplicity of transmitters and receivers distributed across respective spaced apart arrays. In such systems, a common, very precise reference frequency signal is customarily supplied to both the transmit and receive array portions. As such, there is the issue of how to take into account phase shift associated with variations in the substantial length of signal transport cable that links the reference frequency source, which is customarily installed in one location of the array, with the remaining portion of the array.

Because terrestrial open loop calibration of the system suffers from the inability to take into account variation in temperature along the transport cable due to changes in sun angle, and variations in obscuration by components of the antenna support platform in the antenna's space-deployed condition, it has been proposed to perform temperature measurements at a number of locations along the cable and provide phase compensation based upon the measured values. A drawback of this approach stems from the fact that there are non-linearities within the cable, so that over different temperatures it is necessary to employ a larger number of values in the calibration table. In addition, because this technique performs multiple measurement points along the cable, it introduces associated variations in loading which, in turn, produce separate amounts of phase shift to the reference frequency signal.

In accordance with the invention disclosed in the above-referenced '843 application, this transport cable-based phase variation problem is effectively obviated by injecting an RF chirp signal into the signal cable from the remote end thereof, and correlating the returned chirp that is reflected from the reference source end with a delayed version of the injected chirp, to derive a measure of the phase delay through the cable between its opposite ends.

Although this approach works quite well for a single length of cable, it can become cumbersome when applied to a multinode system, wherein the reference signal is to be delivered to a plurality of spatially separated array sites. One straightforward approach would be to implement a star-configured architecture, with each spoke of the star containing its own dedicated chirp generator and associated processing circuitry. Unfortunately, such an approach is hardware intensive, and costly to implement.

SUMMARY OF THE INVENTION

In accordance with the present invention, this problem is effectively obviated by employing a distributed network to connect multiple array nodes with a single source of the reference frequency signal, and injecting a single chirp from a far end node of the distributed reference frequency transport medium toward the reference frequency source node. The source of the reference frequency signal is coupled to the reference frequency signal transport medium by way of a bandpass filter, which is centered on the output frequency of the reference frequency signal generator.

A chirp signal, such as that produced by a direct digital synthesizer, is injected onto the reference frequency signal transport medium at a downstream-most end of the cable. The chirp signal propagates 'up' the cable in a 'forward' direction and is extracted at each of a plurality of sites or nodes to which the reference frequency signal is distributed, before being reflected from the bandpass filter and returning back 'down' the cable in a 'reverse' direction.

Each reference frequency utilization location along the cable is configured to extract the upstream-directed chirp signal and the reflected and downstream-directed return chirp signal. These two chirp signals are coupled to respective inputs of a mixer, the difference frequency output of which is coupled to a frequency domain operator, such as a Fast Fourier Transform (FFT)-based operator. The FFT operator is operative to process the difference frequency content of the output of the mixer to derive a measure of the electrical distance between that respective site and the reflective termination at the reference frequency signal source end of the cable. Given this electrical distance the array signal processor for that site determines the amount of phase shift which the reference frequency undergoes in traversing the section of cable between the reference frequency signal source end and the site or node of interest.

DETAILED DESCRIPTION

Figure 1:
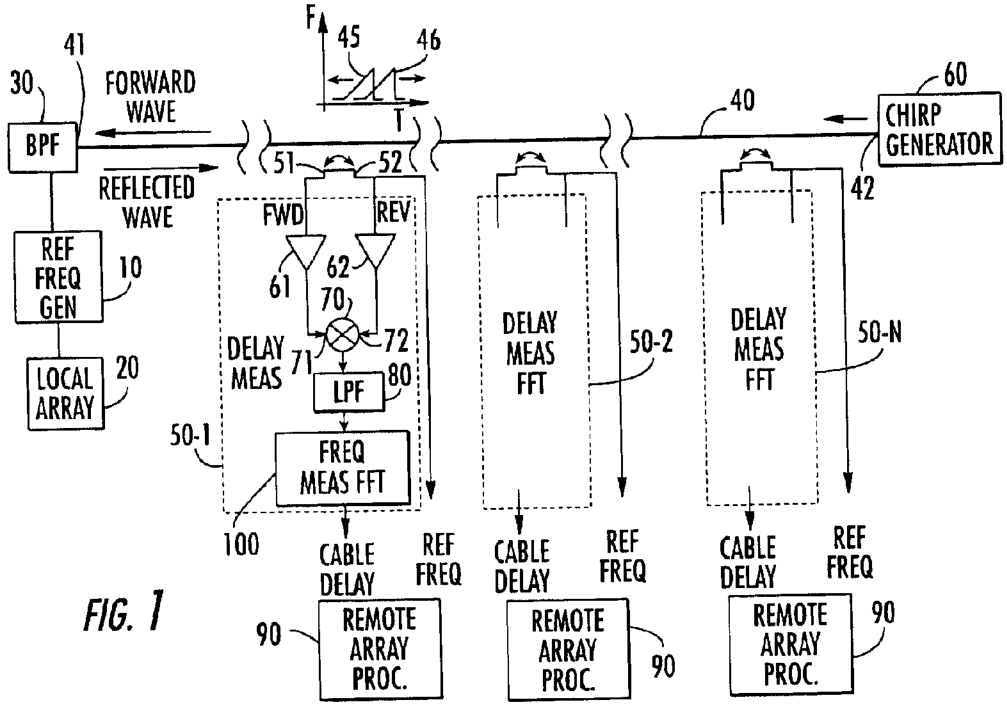
FIG. 1 diagrammatically illustrates an embodiment of the distributed node configured phase calibration architecture of the present invention.

Before describing in detail the distributed chirp-based phase calibration arrangement of the present invention, it should be observed that the invention resides primarily in a modular arrangement of conventional communication circuits and components and an attendant supervisory controller therefor, that controls the operations of such circuits and components. In a practical implementation that facilitates their being packaged in a hardware-efficient equipment configuration, this modular arrangement may be implemented by means of an application specific integrated circuit (ASIC) chip set.

Consequently, the architecture of such arrangement of circuits and components has been illustrated in the drawings by a readily understandable block diagram, which shows only those specific details that are pertinent to the present invention, so as not to obscure the disclosure with details which will be readily apparent to those skilled in the art having the benefit of the description herein. Thus, the block diagram illustration is primarily intended to show the major components of the invention in a convenient functional grouping, whereby the present invention may be more readily understood.

Attention is initially directed to the FIG. 1, wherein an embodiment of the distributed chirp-based cable calibration arrangement of the present invention is diagrammatically illustrated. As shown therein, a reference frequency signal generator 10, such as a very stable oscillator that drives a remote antenna array 20, is coupled to a bandpass filter 30, which is centered on the output frequency of the reference frequency signal generator. Bandpass filter 30 is coupled to a first end 41 of a length of cable 40, which serves to supply the reference frequency signal produced by generator 10 to a plurality of remote array sites 50-1, 50-2, . . . , 50-N distributed along the cable.

As pointed out above, one or more portions of the reference frequency signal distribution cable 40 can be expected to be subjected to temperature variations (and accompanying variations in cable length/transport delay) due to changes in temperature, such as those associated with changes in sun angle, and obscuration by components of the antenna support platform. The present invention solves this problem and provides an accurate measure of respective sections of cable transport delay, by injecting a chirp signal from a second or downstream-most end 42 of the cable. When so injected by a chirp generator 60 (such as, but not limited to a direct digital synthesizer (DDS)), the chirp signal propagates up the cable in a 'forward' direction and is extracted at each of the distributed-sites 50-*i*, before being reflected from the bandpass filter 30 and returning back down the cable in a 'reverse' direction.

Each location 50-*i* contains a pair of forward and reverse couplers 51 and 52, that are respectively operative to extract the upstream-directed chirp signal shown at 45 in the frequency vs. time diagram and the reflected and downstream-directed return chirp signal shown at 46. The forward chirp signal processing path from coupler 51 is coupled through an amplifier 61 to a first input 71 of a mixer 70. The reverse chirp signal processing path from coupler 52 is coupled through amplifier 62 to a second input 72 of mixer 70. The output of the mixer is coupled to a low pass filter 80, which is operative to couple the difference frequency output of mixer 70 to a Fast Fourier Transform (FFT) operator 100.

Figure 2:
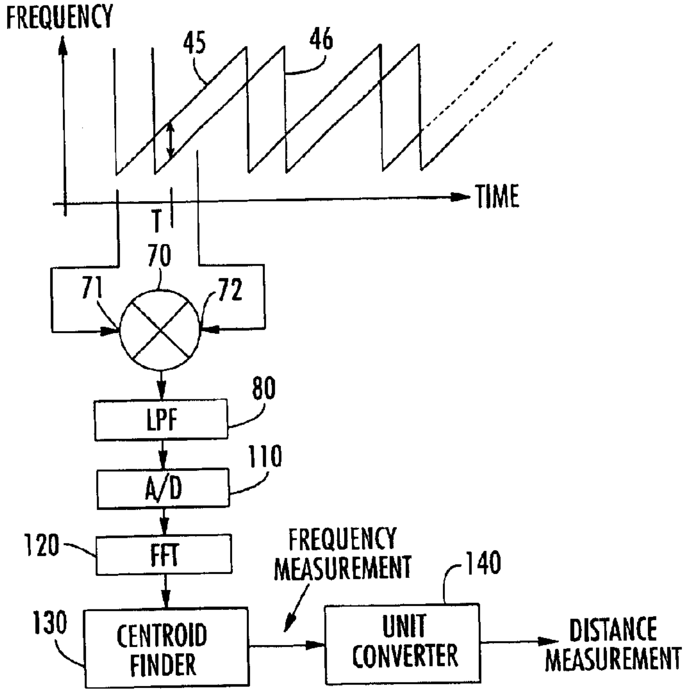
FIG. 2 diagrammatically illustrates a non-limiting example of an implementation of the FFT operator employed in the architecture of FIG. 1.

FFT operator 100, shown in detail in FIG. 2 to be described, is operative to process the difference frequency content of the output of mixer 70 to derive a measure of the electrical distance between site 50-*i* and the reflective termination (bandpass filter 30) at the reference frequency signal source end 41 of the cable 40. Given this electrical distance the array signal processor 90 for site 50-*i* may readily determine the amount of phase shift which the reference frequency undergoes in traversing the section of cable between reference frequency signal source end 41 and the site or node of interest.

Referring now to FIG. 2, a non-limiting example of an implementation of the FFT operator 100 is shown as comprising an analog-to-digital (A/D) converter 110 that is coupled to sample the difference frequency output of the low pass filter 80. The sampled difference frequency data is subjected to an FFT 120, so as to provide a relatively coarse measurement of the electrical distance between the reference frequency signal source termination 41 and the node of interest. The output of FFT 120 is then subjected to a centroid finder 130, which reduces the relatively coarse electrical distance measurement to a relatively fine electrical distance value. The electrical distance value produced by centroid finder 130 is then converted into a phase offset value for that node's cable delay by means of a unit converter 140.

It should be noted that the rate of change of cable length is considerably slower relative to the processing time associated with the operation of the invention. As noted previously, in an environment, such as a spaceborne application, changes in cable length due to temperature are ambient effects, such as sun angle and obscuration by components of the antenna support platform. Such changes are very slow relative to the high signal transport and processing speeds associated with the generation of the chirp and correlation processing of the chirp return, which may be in the pico to microsecond range.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. For use with an electrical apparatus having a signal transport path along which a plurality of nodes are distributed, one of said nodes being coupled with a reference frequency signal source that is operative to generate a reference frequency signal that propagates along said signal transport path and is distributed thereby to others of said plurality of nodes, said signal transport path imparting a variable delay therethrough of said reference frequency signal employed by said apparatus to operate electrical devices at said nodes, as a result of temperature variations along said signal transport path, a method of providing a measure of delay through said signal transport path between said one of said nodes and a respective one of said others of said nodes, said method comprising the steps of:

(a) at a selected location along said signal transport path that is farther away from said one of said nodes than said others of said nodes, injecting a chirp signal into said signal transport path so that said chirp signal propagates as an upstream chirp signal over said signal transport path and is reflected from said first node and propagates therefrom along said signal transport path as a downstream chirp signal; and (b) at said respective node, extracting and processing said upstream chirp signal and said downstream chirp signal to derive a measure of signal transport delay through said signal transport path between said one of said nodes and said respective node.

2. The method according to claim 1, wherein said apparatus comprises an antenna.

3. The method according to claim 1, wherein said apparatus comprises a phased array antenna, and wherein said electrical devices comprise array elements of said antenna.

4. The method according to claim 1, wherein step (b) comprises mixing said upstream chirp signal and said downstream chirp signal to derive a difference frequency signal, and subjecting said difference frequency signal to a frequency domain operator to derive said measure of signal transport delay through said signal transport path between said one of said nodes and said respective node.

5. The method according to claim 4, wherein said frequency domain operator comprises a Fast Fourier Transform.

6. An apparatus comprising:

a signal transport path along which a plurality of nodes are distributed, said nodes having respective electrical devices coupled therewith;

a reference frequency signal source coupled with one of said nodes and being operative to generate a reference frequency signal that propagates along said signal transport path and is distributed thereby to others of said plurality of nodes, said signal transport path imparting a variable delay therethrough, of said reference frequency signal employed by said apparatus to operate said electrical devices at said nodes, as a result of temperature variations along said signal transport path;

a chirp signal generator, coupled with said signal transport path at a selected location therealong that is farther away from said one of said nodes than said others of said nodes, and being operative to inject a chirp signal into said signal transport path so that said chirp signal propagates as an upstream chirp signal over said signal transport path and is reflected from said first node and propagates therefrom along said signal transport path as a downstream chirp signal; and a chirp signal processor coupled with a respective node of said others of said nodes, and being operative to extract and process said upstream chirp signal and said downstream chirp signal to derive a measure of signal transport delay through said signal transport path between said one of said nodes and said respective node.

7. The apparatus according to claim 6, wherein said apparatus comprises an antenna.

8. The apparatus according to claim 6, wherein said apparatus comprises a phased array antenna, and wherein said electrical devices comprise array elements of said antenna.

9. The apparatus according to claim 6, wherein said chirp signal processor is operative to mix said upstream chirp signal and said downstream chirp signal to derive a difference frequency signal, and to subject said difference frequency signal to a frequency domain operator to derive said measure of signal transport delay through said signal transport path between said one of said nodes and said respective node.

10. The apparatus according to claim 9, wherein said frequency domain operator comprises a Fast Fourier Transform.

11. The apparatus according to claim 6, wherein said one node has a bandpass filter that is operative to pass said reference frequency signal but reflect said chirp signal.

12. A method comprising the steps of:

(a) distributing a plurality of nodes along a signal transport path;

(b) coupling a reference frequency signal generator to one of said nodes, so that a reference frequency signal generated thereby propagates in a downstream direction along said signal transport path and is distributed to others of said plurality of nodes, said signal transport path imparting a variable delay therethrough of said reference frequency signal, as a result of temperature variations along said signal transport path;

(c) at a selected location along said signal transport path that is farther away from said one of said nodes than said others of said nodes, injecting a chirp signal into said signal transport path so that said chirp signal propagates as an upstream chirp signal over said signal transport path and is reflected from said first node and propagates therefrom along said signal transport path as a downstream chirp signal; and (d) at each of said other nodes, extracting and processing said upstream chirp signal and said downstream chirp signal to derive a measure of signal transport delay through said signal transport path between said one of said nodes and said each node.

13. The method according to claim 12, wherein said apparatus comprises an antenna.

14. The method according to claim 12, wherein said apparatus comprises a phased array antenna, and wherein array elements of said antenna are coupled to said nodes.

15. The method according to claim 12, wherein step (d) comprises mixing said upstream chirp signal and said downstream chirp signal to derive a difference frequency signal, and subjecting said difference frequency signal to a frequency domain operator to derive said measure of signal transport delay through said signal transport path between said one of said nodes and said respective node.

16. The method according to claim 15, wherein said frequency domain operator comprises a Fast Fourier Transform.

* * * * *